United States Patent [19]

Nguyen et al.

[11] Patent Number: 5,576,941
[45] Date of Patent: Nov. 19, 1996

[54] MODULAR POWER SUPPLY SYSTEM

[75] Inventors: Chien Nguyen, Loxahatchee; Douglas A. Johns, Atlantis, both of Fla.

[73] Assignee: York Technologies, Inc., Riviera Beach, Fla.

[21] Appl. No.: 286,838

[22] Filed: Aug. 10, 1994

[51] Int. Cl.⁶ .................................................. H02M 3/335
[52] U.S. Cl. ................................ 363/21; 363/26; 363/97; 363/133
[58] Field of Search ............................ 363/41, 19, 21, 363/56, 24, 26, 25, 91, 97, 133, 135; 323/222

[56] References Cited

U.S. PATENT DOCUMENTS

| | | | |
|---|---|---|---|
| 4,281,374 | 7/1981 | Archer | 363/41 |
| 4,673,826 | 6/1987 | Masson | 307/66 |
| 4,709,318 | 11/1987 | Gephart et al. | 363/37 |
| 5,144,205 | 9/1992 | Motto et al. | 315/244 |
| 5,187,414 | 2/1993 | Fellows et al. | 315/307 |

*Primary Examiner*—Peter S. Wong
*Assistant Examiner*—Shawn Riley
*Attorney, Agent, or Firm*—Morton J. Rosenberg; David I. Klein

[57] ABSTRACT

A modular power supply system (10) is provided for providing a multiplicity of output voltages from a plurality of respective converter modules (70a–70n). Each of the converter modules (70a–70n) has an input coupled to a DC high voltage bus (22) from which a respective output voltage is generated. The voltage supplied on DC bus (22) is generated by a power factor corrected boost converter circuit (20) which is coupled to an AC input source (12). Further, a battery backup module (40) is coupled to the high voltage DC bus (22) for supplying backup power whenever the bus voltage drops below a predetermined level.

25 Claims, 8 Drawing Sheets

MODULAR POWER SUPPLY SYSTEM

BACKGROUND OF THE INVENTION

1. Field of the Invention

This invention directs itself to modular power supply systems for use with computers and telecommunications equipment. In particular, this invention directs itself to a modular system wherein an input voltage is boosted to a high voltage level, the high voltage being utilized as the input for one or more output modules. Further, this invention directs itself to a power supply system having a battery backup subsystem for maintaining the high voltage level input to the one or more output modules. Still further, this invention directs itself to power supply systems having inverter circuits utilizing a transformer having a controlled leakage inductance. More in particular, this invention pertains to inverter circuits having controlled leakage inductance transformers defined by wiring assemblies wherein conductors are deposited on an insulating substrate, and the substrate wound on a bobbin of the transformer to provide leakage inductance of a predetermined magnitude which can be repeatedly reproduced.

2. Prior Art

Power supply systems are well known in the art. Further, power supply systems having battery backup power sources are also well known in the art. Such existing systems, however, do not provide a positive indication of battery capability, and thus may produce a catastrophic failure when the primary power is lost.

Some prior art systems must be switched from the primary source to a battery backup source responsive to detection of a loss of the primary power source. Such switchover between sources of energy result in transients being generated and transmitted to the loads coupled to the power supply output. In other situations, the switching may be fast enough to avert the generation of such transients, but allows the voltage input to the output inverter circuits to droop sufficiently so as to disturb the regulation of the output voltage being supplied to the load.

In other prior art systems, the battery backup system can only be tested by removing the primary power source and allowing the changeover circuit to detect the loss of primary power and energize the backup system. Obviously, if there is a fault in the battery backup system, the output load will cease to be supported and such is unacceptable for critical computer and telecommunications applications.

Accordingly, the present invention has been developed to overcome the specific shortcomings of prior art systems, such as those described above, as well as achieve other benefits and improvements over prior art systems.

SUMMARY OF THE INVENTION

A modular power supply system is provided. The modular power supply system includes a DC voltage bus and a boost converter circuit having an input coupled to a power source for generating a first DC voltage signal from an input line voltage supplied by the power source. The boost converter circuit has an output connected to the DC voltage bus for coupling the first DC voltage signal to the DC voltage bus. The modular power supply system also includes at least one converter module having an input coupled to the DC voltage bus for converting the first DC voltage signal to a second DC voltage signal. The second DC voltage signal may be of a lesser magnitude than the magnitude of the first DC voltage signal where such converter module is a down converter, or may be greater magnitude where an up converter is utilized. The modular power supply system further includes a battery backup module having an input and an output coupled to the DC voltage bus for generating a third DC voltage signal responsive to the magnitude of the first DC voltage signal decreasing in value below a predetermined first reference value. The modular power supply system also includes a first control circuit for generating a control voltage signal and having (1) a first input coupled to the input of the up converter circuit for monitoring the input line voltage, (2) a second input coupled to the DC voltage bus for monitoring the first DC voltage signal, and (3) first and second outputs respectively coupled to the at least one down converter module and to the battery backup module for supplying the control voltage signal respectively thereto.

It is therefore an object of the invention to provide a modular power supply system capable of powering critical computer and telecommunications equipment with a high degree of reliability and the prevention of momentary disturbances in the output to such equipment.

It is a further object of the invention to provide highly efficient inverter circuits utilizing inverter transformers having a controlled leakage inductance.

It is still further an object of the invention to provide a controlled transformer structure having a predetermined leakage inductance which can be repeatedly manufactured.

It is yet a further object of the invention to provide a modular power supply system wherein the source voltage is boosted and Supplied to a plurality of output modules, each of the output modules down converting the boosted voltage to a predetermined output voltage.

It is a further object of the invention to provide a battery backup module which monitors the high voltage DC bus, and maintains that bus voltage automatically at a level within the regulation limits of the output modules.

These and other advantages and novel features of the invention will become apparent from the following detailed description when considered in connection with the accompanying drawings wherein:

DESCRIPTION OF THE PREFERRED EMBODIMENTS

Figure 2:
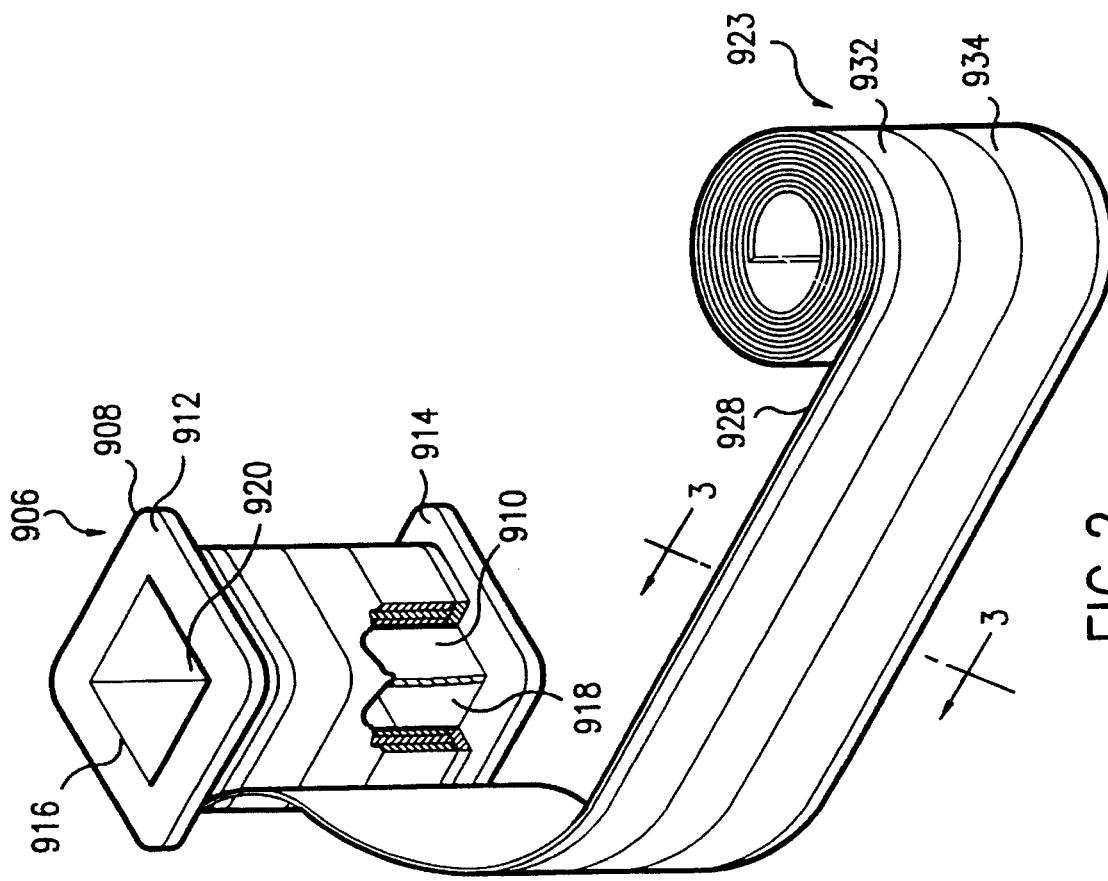
FIG. 2 is a partially exploded view of a bobbin assembly of the present invention.

Referring to the Figures, there is shown modular power supply system 10 for providing highly regulated voltages to computer and telecommunication systems. As will be seen in following paragraphs, modular power supply system 10 includes an input conversion circuit 20 which provides power factor correction, such that system 10 substantially represents a resistive load to the alternating current voltage source to which system 10 is connected. The input converter 20 provides power to a high voltage DC bus 22, from which a plurality of output modules 70a–70n draw power and convert such to respective predetermined output voltages. Further, system 10 includes a battery backup module 40 for maintaining the high voltage DC bus power during an outage of the AC source, allowing the computer or telecommunications systems coupled to system 10 to be maintained in operation, or shut down in an orderly manner. Of particular importance, is the means by which the battery backup module maintains the power supplied to the high voltage bus 22, the module monitoring the bus voltage and regulating such at a threshold level below the normal voltage of bus 22, but at a level sufficiently high such that the output voltages of output modules 70a–70n are unaffected.

As will be further described in following paragraphs, modular power supply system 10 operates with high efficiency which in large part is made possible by the use of inverter transformers having a predetermined leakage inductance controlled by the structure thereof, and repeatable from one unit to another. The controlled leakage inductance of the inverter transformers are achieved utilizing a ribbon-type wiring assembly wound thereon. The flat ribbon-like structure provides precision inductance values and consistent repeatability from one transformer to the next, improving reliability and improved manufacturability, obviating the need for components having adjustable reactances or the addition of particular tuning elements, which must be empirically determined through tests of a particular power supply system 10.

Figure 1:
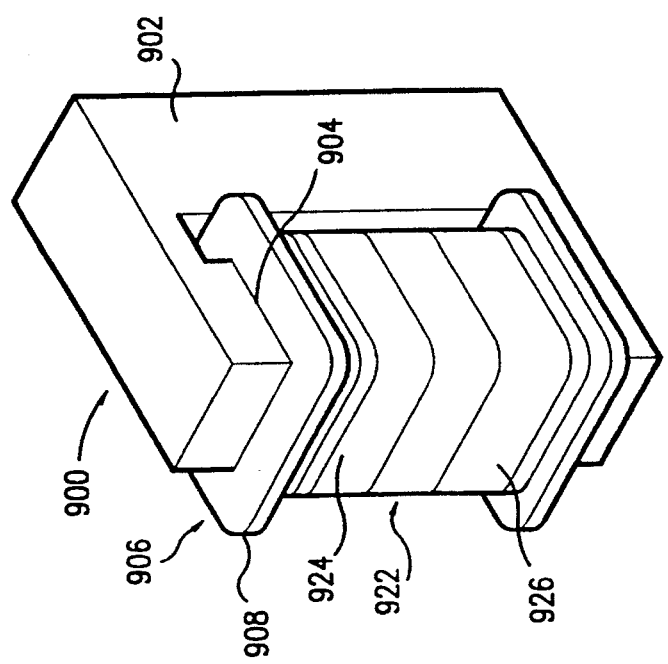
FIG. 1 is a perspective view of a controlled leakage inductance transformer of the present invention.

Referring to FIGS. 1 and 2, there is shown, the controlled leakage inductance transformer 900 which defines the structure of the inverter transformer which may be advantageously utilized in the converter modules 70a–70n and the battery backup module 40. Transformer 900 may have a core 902 which forms a closed loop through the winding assembly 922. The particular contour of core 902 is not important to the inventive concept, and may be any configuration appropriate to a particular application. Transformer core 902 may include gaps for increasing reluctance, or if the application permits, be eliminated altogether to provide an air-core structure.

Typically the core 902 will have at least one leg portion 904 extending through the through bore 920 of hollow core 910 of a bobbin assembly 906. Depending on the configuration of core 902, transformer 900 may include multiple bobbin assemblies disposed on a single leg portion 904, or each disposed on a separate leg of core 902. The winding assembly 922 carried by bobbin 908 is formed by a wiring assembly 923 wound on the hollow core portion 910 of bobbin 908. The bobbin assembly 906 includes a bobbin 908 on which the wiring assembly 923 is wound to form the winding assembly 922, which may consist of one or more windings disposed in spaced parallel relation on an insulator 928.

The bobbin 908 is defined by an axially extended hollow core 910 having a pair of end walls 912, 914 extending radially outward on opposing ends of hollow core 910. The hollow core region 910, extending between opposing end walls 912 and 914 defines the area upon which the wiring assembly 923 is wrapped, the wiring assembly 923 carrying at least one conductor 932, 934 for forming at least one inductive winding 924, 926 thereon. Each of the end walls 912, 914 has an opening 916, 918 formed therethrough and in open communication with the interior 920 of hollow core 910.

Figure 3:
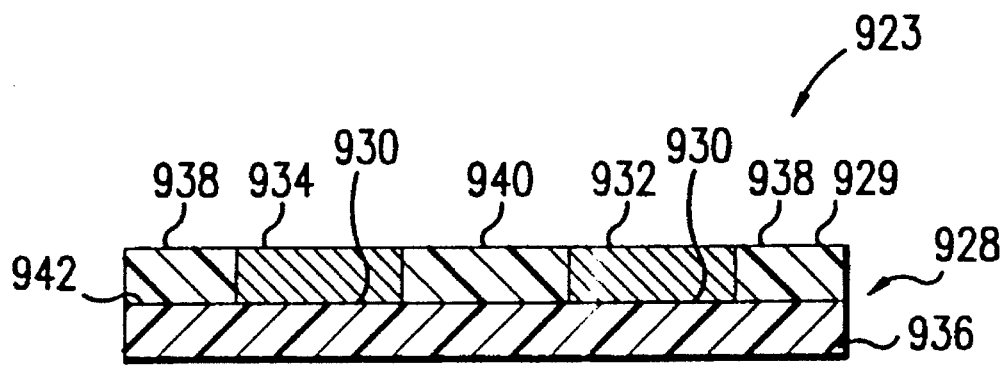
FIG. 3 is a sectional view of the wiring assembly of the present invention taken along the section line 3—3 of FIG. 2.
Figure 7:
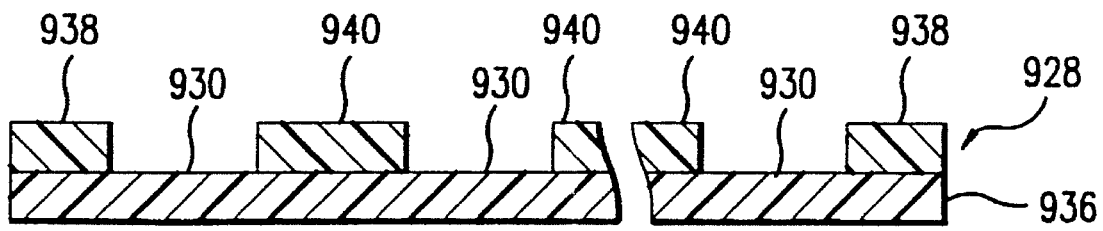
FIG. 7 is a cross-sectional view of an insulator of the present invention.

Turning now additionally to FIG. 3, there is shown a cross-sectional view of wiring assembly 923, wherein the first conductor member 932 and the second conductor member 934 are each respectively disposed within recesses 930 formed in the insulator 928. Insulator 928 is formed by a longitudinally extended substrate member 936 and at least a pair of longitudinally extended blocking members 938 secured to an upper surface 942 of the substrate member 936 in spaced parallel relation. Where the substrate member 936 carries more than one conductive member, the insulator 928 will further include at least one intermediate blocking member 940, disposed between adjacent conductive members. Thus, the recess 930 is defined by the space between the blocking members 938, where only a single conductive member is utilized, such as in a choke assembly, or alternately, in a transformer wherein each winding is wound on a separate bobbin 908. As shown in FIG. 7, the insulator 928 may include a plurality of intermediate blocking members 940 disposed in spaced parallel relation for defining a plurality of recesses 930 into which a respective plurality of conductive members will be formed.

Figure 5:
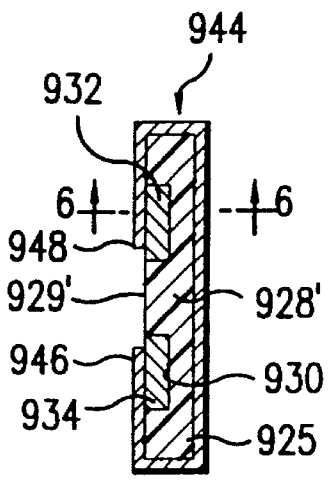
FIG. 5 is a cross-sectional view of the wiring assembly showing one configuration for the connecting assembly of the present invention.

Of particular importance, is the fact that wiring assembly 923 is formed of elements having predetermined dimensions which may be produced to very tight tolerances, allowing for a design having a predetermined self-inductance, mutual inductance, and leakage inductance. The value oil the leakage inductance has a high degree of repeatability from one unit to the next and can be designed to be a very low value. In the formation of wiring assembly 923, the longitudinally extended insulator 928 may be first constructed by securing of the blocking members 938, 940 to the substrate 936, such as by adhesive bonding. Thus, the blocking members 938, 940 may be provided with an adhesive backing for securement to the substrate 936. Alternately, as shown in FIG. 5, insulator 928 may be formed in integral one-piece formation with respective recesses 930 formed therein. The recesses 930, either being defined between adjacent blocking members or formed in the surface 929' of the integrally formed insulator 928', receive a deposit of a conductive material, which when wrapped about the hollow core 910 of bobbin 908 defines the inductive windings of transformer 900. The conductive members are applied to the substrate 936 by a deposition process, well known in the art. Such well known processes as sputtering, chemical vapor deposition and silk screening of conductive pastes may be utilized to form the conductive members 932, 934.

Figure 4:
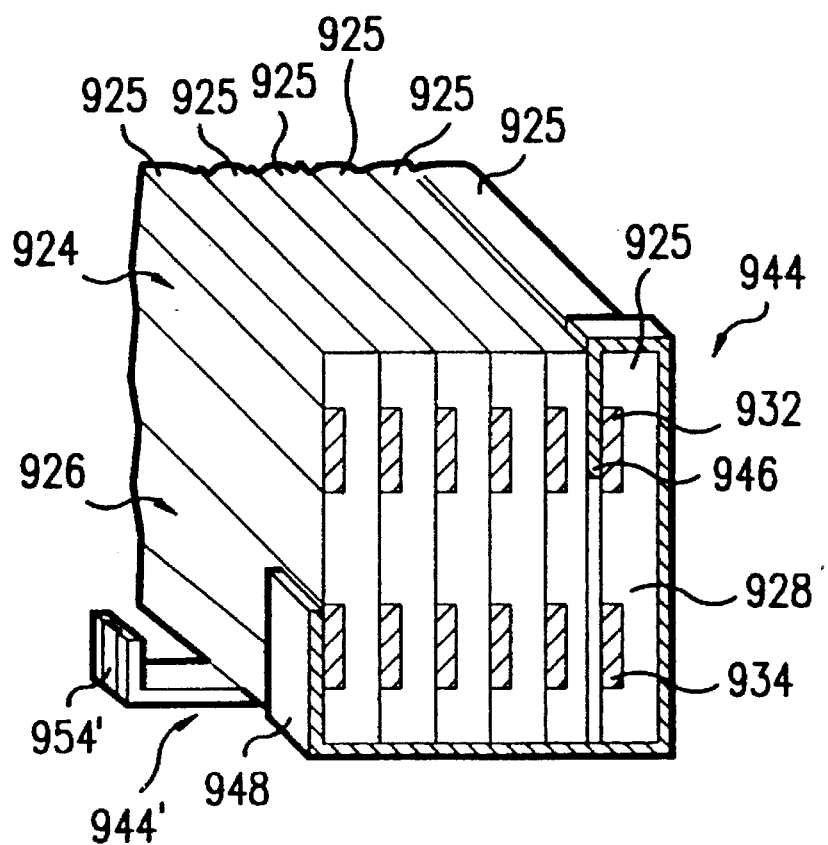
FIG. 4 is a perspective view of a sectioned winding assembly of the present invention.

Of particular importance, is the fact that the conductive members disposed within respective recesses 930 are formed with an upper surface which is coextensive with the upper surface 929 of insulator 928. This arrangement allows one layer 925 of the wrapped wiring assembly 923 to be disposed in contiguous overlaying relationship with an overlying layer 925 of the wrapped wiring assembly, as shown in FIG. 4. It should be noted that the conductive members 932, 934 may be deposited on the substrate 936 prior to the securement of the blocking members 938, 940. In such case, the blocking members 938, 940 are applied to the substrate on opposing sides of the deposited conductive members 932, 934 in a subsequent operation.

As shown in FIG. 4, separate windings 924 and 926 may be electrically interconnected by connecting assembly 944 to form a single winding thereby. In this manner the innermost end of the winding 924 may be connected to the end 946 of connecting assembly 944 for coupling with outermost end of winding 926 through the end 948 of connecting assembly 944. Similarly, the innermost end of winding 926 may be brought out of the winding assembly 922 in a similar manner, with the respective connecting assembly 944' being disposed in spaced parallel relation with the connecting assembly 944. The conductive member 954' of connecting assembly 944' providing the electrical connection to the conductive member 934.

Referring now to FIG. 5, there is shown another connection configuration of the connecting assembly 944. As previously discussed, the wiring assembly may utilize a longitudinally extended insulator 928' which is integrally formed in one-piece formation. The respective conductors 932 and 934 disposed in respective recesses 930 may be interconnected on the same wiring layer 925 by placing one end 948 of connecting assembly 944 in contiguous transverse overlaying relationship with conductor 932 and wrapping the connecting assembly around the rear side of insulator 928, bringing the opposing end 946 of connecting assembly 944 into contiguous transverse overlaying relationship with conductive member 934. This portion of wiring assembly 923 is wrapped on the hollow core 910 and overlaid with subsequent layers 925, not unlike that which is shown in FIG. 4.

Figure 6:
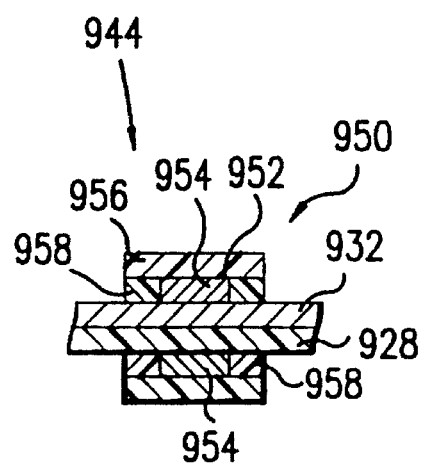
FIG. 6 is a sectional view of the connecting assembly taken along the section line 6—6 of FIG. 5.

The structure of the connecting assembly 944 is similar to that of wiring assembly 923, as shown in FIG. 6. The wiring assembly 944 includes an insulator 950, which may be integrally formed in one-piece formation like that of insulator 928', or alternately formed by securing a pair of blocking members 958 to a substrate member 956. A conductive member 954 is formed by a deposition process in the recess 952. The recess 952 may be formed in the integrally formed insulator, or alternately is formed by the space between the spaced parallel blocking members 958 bonded to the substrate 956. The tight winding Of the wiring assembly 923 about the hollow core 910 of bobbin 908 insures intimate contact between the electrical conductive members to provide a good electrical connection therebetween.

Insulators 928 and 950 may be any of a wide variety of plastic material compositions. In particular, polyesters, polyamides and fluoroplastics are of the type having properties well suited for this application. Such materials are available under the trade names Mylar, Nylon, Teflon and Tefzel. Using these materials, of predetermined thicknesses, the spacing between conductive layers is thereby established and maintained substantially constant throughout the construction of the transformer 900. These dimensions will not substantially vary from one transformer 900 to another. Similarly, the cross-sectional area of the respective conductors 932, 934, 954 can be determined based upon the desired resistance for the respective winding and the current carrying capacity required for a particular application. The fact that the conductors are located on the insulator in a fixed position, which will not vary from one layer 925 to another, further adds to the precision by which the inductance and leakage inductance can be predetermined, with the leakage inductance being able to be maintained at a low level. The values of these variables being consistently maintained in a manner not possible by conventional wire winding techniques.

Figure 8:
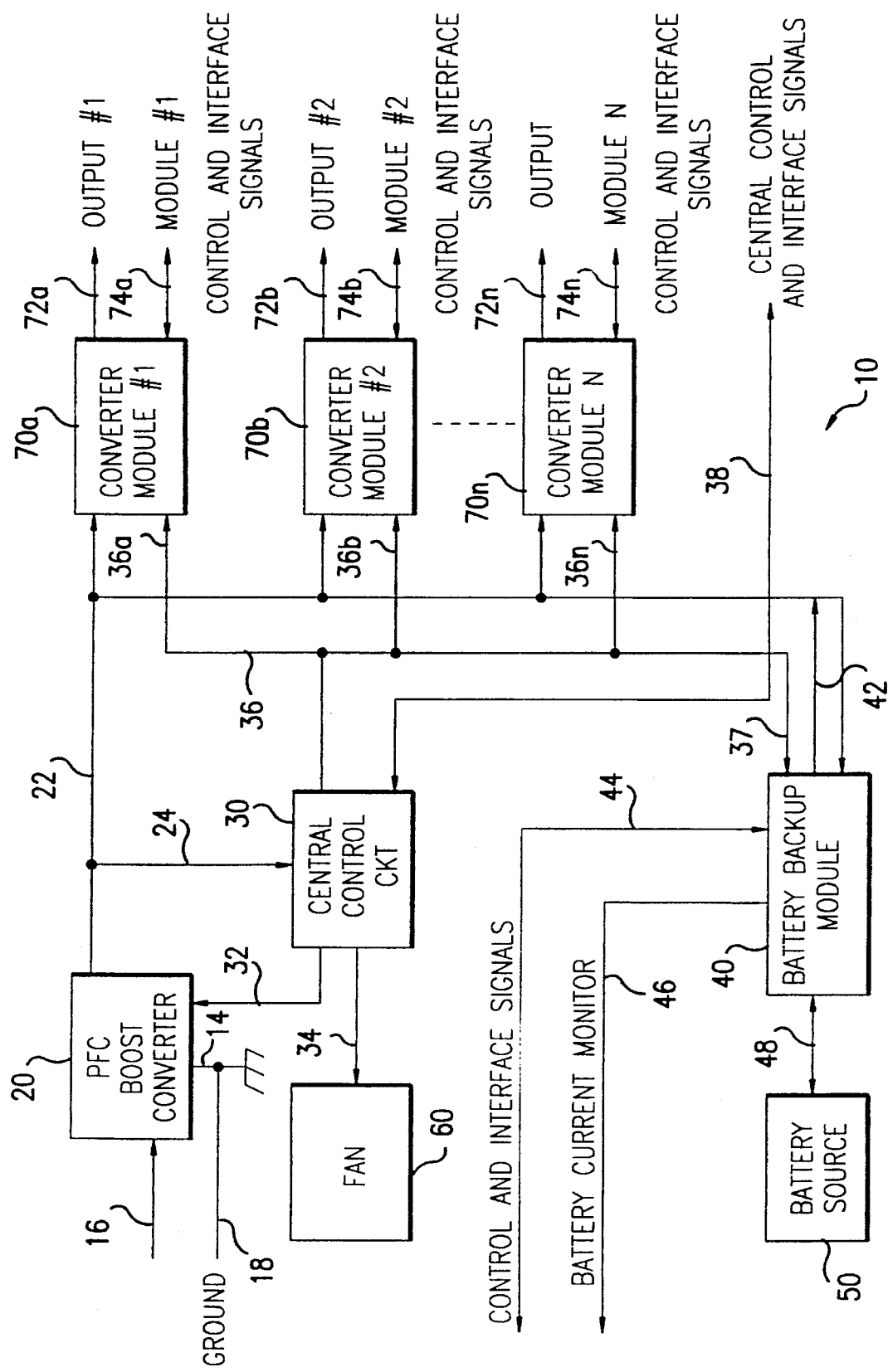
FIG. 8 is a block diagram of the modular power supply system of the present invention.

Referring now to the block diagram of the modular power supply system 10, shown in FIG. 8, the other novel features of system 10 will be described in following paragraphs. In broad concept, the AC power supplied on line 16 is converted to a high voltage DC level for distribution to a plurality of output modules 70a–70n on a DC voltage bus 22. The output modules down convert the DC voltage supplied on bus 22 to particular predetermined DC or AC levels for output to respective loads on the output lines 72a–72n. This two stage approach, boost converting the input voltage and down converting from the boost converted voltage improves the overall regulation of the system. As will be described in following paragraphs, the voltage output to bus 22 is maintained substantially constant for an input AC RMS voltage on line 16 within the range of 90–264 volts. With a substantially constant voltage supplied to the input of the down converter modules 70a–70b, those modules are better able to regulate their respective outputs, with their input voltage being substantially invariant. The arrangement further provides for an efficient means to incorporate a battery backup function, the battery backup module 40 monitoring the voltage of bus 22 and maintaining such at a predetermined level without introducing any switching transients or time delay between loss of the AC input voltage and power being supplied from the battery source.

Thus, boost converter 20 functions to convert the AC power supplied on line 16 to a high voltage DC output supplied to the DC voltage bus 22, in a manner which makes system 10 appear as a substantially resistive load to the AC source. As will be described in following paragraphs, boost converter 20 provides for power factor correction, controlling the switching signal to an inverter to substantially maintain the AC voltage and current in phase and thereby provide substantially the unity power factor, within a few percent.

As is conventional with large power supply systems, the system ground 14 is coupled to an external earth ground by a line 18. Although each of the modules coupled to the DC bus 22 include their own discrete control circuitry, system 10 includes a central control circuit 30 for coordinating the operations of system 10, providing alarms to external devices, providing for start up of the system and emergency shut down thereof. Central control circuit 30 generates bias voltages and synchronization signals which are output to each of the down converter modules 70a–70n on the output line 36 for respective coupling to each of the modules by the lines 36a–36n. Central control circuit 30 also provides an output 32 which is coupled to the power factor corrected boost converter 20 to provide a synchronization signal and bias voltage thereto. The generation of the bias voltages which are supplied to each of the modules define the power source for the amplifiers and logic circuits therein, and thereby provide an efficient means for shutting the system down from a central point in the system, as will be further described. Central control circuit 30 monitors the thermal conditions of system 10 and also provides the operational voltage to a DC fan 60 by the coupling line 34. Additionally, control circuit 30 monitors the voltage level of bus 22 by means of the coupling line 24 in order to provide for start up of the system and properly generate the bias voltages supplied to each of the modules and the power factor corrected up converter 20.

System 10 may include at least one converter module, with additional modules added as required to meet the demands of a particular application. Although such converter modules are typically down converters, they may be up converter modules for applications requiring such. Each of the modules 70a–70n derive their input power from the DC voltage bus 22, and are designed to provide a predetermined regulated output voltage on their respective output lines 72a–72n. The down converter modules are designed to maintain a substantially constant output voltage, which may be AC or DC, depending upon the particular application, with a variation of input voltage within the range of 300–420 volts, with the voltage on bus 22 being maintained at substantially 390 volts by boost converter 20. Each of the down converter modules 70a–70n also provides alarm and interface signals to the particular load to which they are connected, through a respective control and interface signal bus 74a–74n. Such interface signals may include a shut down control signal transmitted from the load to the down converter module, to disable the output therefrom responsive to some external condition.

It is particularly important to the application of modular power supply system 10 in critical computer and telecommunications applications that it maintain the regulated output voltage from each of the respective down converter modules 70a–70n during interruptions in the AC power supplied on line 16, which is accomplished by means of the battery backup module 40. The battery backup module is coupled to the bias and synchronization signal output of central controller circuit 30 by means of the coupling line 37, and is coupled to the DC voltage bus 22 for monitoring the magnitude of the voltage thereon. Battery backup module 40 provides an output 42 coupled to DC voltage bus 22 for supplying a DC voltage output, responsive to a drop in the bus voltage from the nominal 390 volts to a level approximating 360 volts. Thus, if the AC voltage on line 16 is interrupted, the power factor correcting boost converter 20 will cease to generate voltage, resulting in its output filter capacitors discharging. The bus voltage will thereby begin dropping, and as such reaches 360 volts, the battery backup module 40 will generate sufficient power to maintain the bus voltage at the 360 volt level, without generating any transience or glitches in the voltage on bus 22. As the change from 390 volts to 360 volts will not affect the regulated output of the down converter modules 70a–70n, the respective output voltages on outputs 72a–72n are unaffected by the transfer from AC power to the battery backup source 50. The battery backup module 40 is coupled to the battery source 50 by a DC bus 48 for carrying battery power to an up converter of module 40 and carries power to the battery from a battery charger circuit of the module 40. Module 40 further supplies battery charger alarm, logic and battery current monitoring signals to external systems through the coupling line 46, and receives control and interface signals from external systems on the bus 44.

Figure 9:
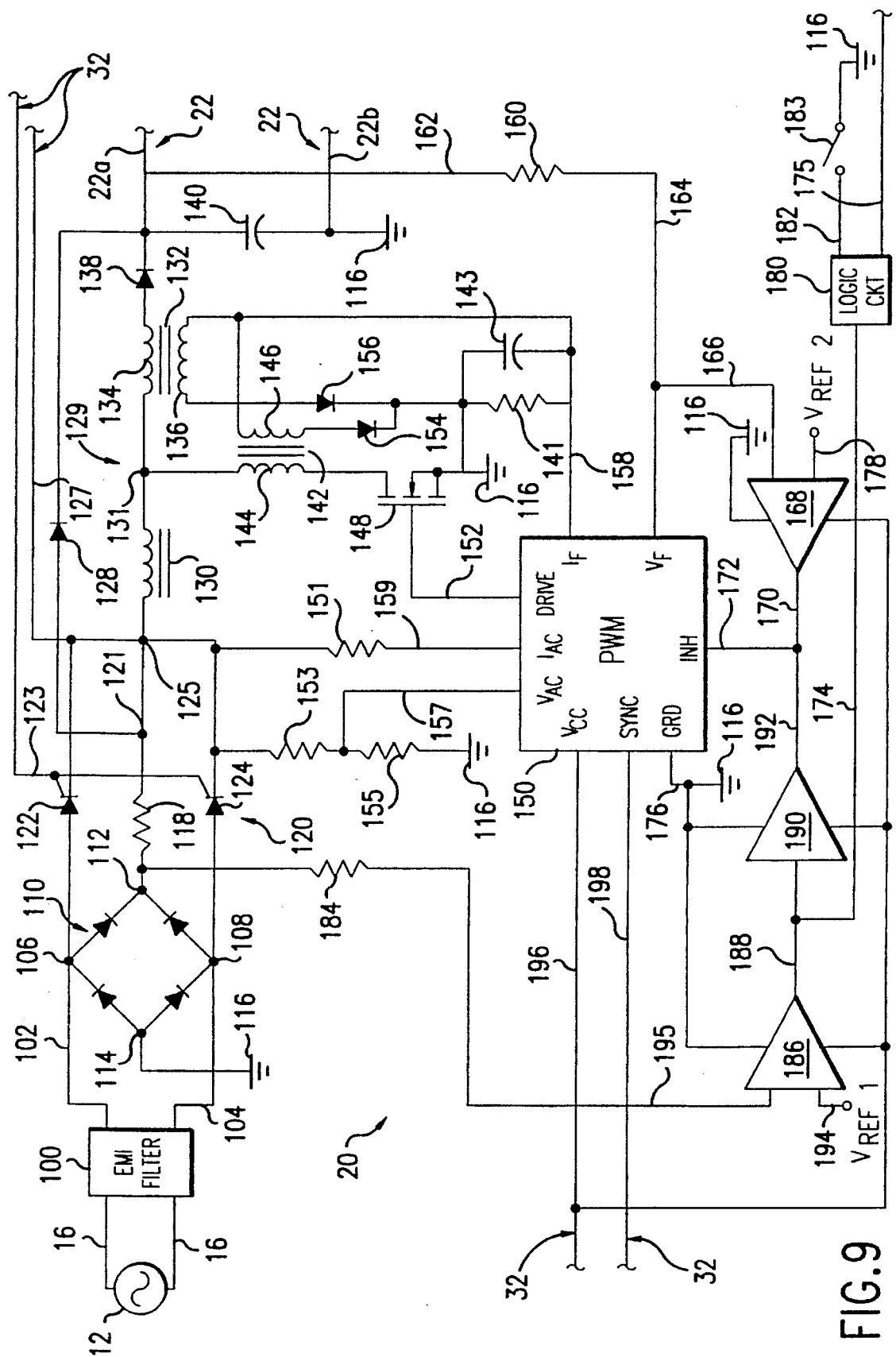
FIG. 9 is a circuit diagram of the power factor corrected up converter circuit of the present invention.

Referring now to FIG. 9, there is shown a circuit diagram for the power factor correcting boost converter 20. AC voltage from the source 12 is supplied by the lines 16 to the electromagnetic interference filter 100 which prevents high frequency noise generated by the inverter circuits of system 10 from being fed back into the AC lines. Such circuits utilize resistance and reactance elements whose value are dependent upon the expected frequencies to be filtered, and are well known in the art. The output of EMI filter 100 is supplied to the AC input terminals 106, 108 of the rectification circuit 110. Rectification circuit 110 may be a diode bridge circuit, or alternately be formed by a combination of a transformer and diodes, as is well known in the art. The output of rectifier circuit 110 is coupled to an in-rush current limit circuit 120, which limits the starting current flowing from rectifier 110 during an initial start up time period. Rectifier circuit 110 includes a negative voltage output terminal 114 which is coupled to the system ground 116, and a positive voltage output terminal which is coupled to one end of a current limiting resistor 118. After the initial start up time period has lapsed, a pair of switching devices 122 and 124 of the in-rush current limit circuit 120 bypass resistor 118 to permit a maximum current to pass to the high voltage DC bus 22.

Switching devices 122 and 124 may be silicon controlled rectifiers (SCRs) each having its anode coupled to a respective AC input terminal 106, 108 of rectifier 110. Each SCR thereby functions as a rectification diode when sufficient gate voltage is applied to the gate drive line 123, which is part of the control signal bus 32 from the central control circuit 30. The gate voltage supplied on line 123 is referenced to the line 127, also part of bus 32, and coupled to the cathodes of the SCRs 122 and 124. A node 121 disposed between the series coupling of current limiting resistor 118 and diode 126 is coupled to the positive voltage line 22a of DC voltage bus 22 through the bypass diode 128. Thus, on initial start up, the rectified voltage from rectifier output terminal 112 is coupled to the positive voltage line 22a of DC high voltage bus 22 by the series circuit comprising resistor 118 and diode 128, which provides current limiting by virtue of the impedance of resistor 118.

The generation of the gate drive voltage for SCRs 122 and 124 will be described in following paragraphs, however, subsequent to such being generated and supplied to the respective gates of SCRs 122 and 124 by line 123, resistor 118 is effectively removed from the circuit. When SCRs 122 and 124 are turned on, alternating half cycles of the AC voltage supplied to the respective anodes thereof is supplied to the node 125 for coupling to the positive voltage line 22a through the boost circuit 129. A voltage path will remain in parallel with the path through the boost circuit 129, through diode 128 until the voltage generated by the boost circuit and supplied to line 22a through diode 138 increases in magnitude above the voltage at node 121.

The inverter boost circuit 129 includes a current transformer 142 having a primary winding 144 through which an oscillation or pulsating current flows responsive to the repetitive switching on and off of the switch 148. Current transformer 142 provides feedback of the current flowing through switch 148. Switch 148 may be any solid state switching device such as a MOSFET switching device, or alternately a plurality of MOSFET switching devices coupled in parallel. Switch 148 is turned on and off responsive to a switching control signal supplied from the DRIVE output terminal of the pulse width modulator/power factor correction circuit 150 by the coupling line 152. The one or more MOSFET switching devices 148 may be a commercially available device having the designation APT5020BNR, manufactured by Advanced Power Technology of Bend, Oreg. Thus, DC voltage supplied to node 131 passes through an inductor 130, for coupling to one end of the primary winding 144 of current transformer 142, and from the opposing end of primary winding 144 through the switching MOSFET 148 to the system ground 116. When the MOSFET 148 is switched from a conductive to a nonconductive condition, a high voltage is induced in the inductor 130 to boost the voltage supplied to the node 131, by flyback voltage inducted in the inductor.

The voltage supplied to node 131 is coupled to the positive voltage line 22a of the DC high voltage bus 22 through the current monitoring transformer primary winding 134 and at least one series coupled blocking diode 138. Blocking diode 138 prevents feedback of voltage supplied to the line 22a through the diode 128 during the initial start up phase of the system and provides rectification of the voltage induced in inductor 130. Blocking diode 138 may be formed by a plurality of series or parallel coupled diodes. The reference voltage line 22b of the voltage bus 22 is coupled to the system ground 116, and a storage capacitor 140 is coupled across the bus voltage lines 22a and 22b for providing low frequency filtering and charge storage. Capacitor 140 may be a single capacitor having a value within the range of 1400–1500 microfarads, or alternately may be formed by a plurality of parallel capacitors, such as a bank of three capacitors, each having a value approximating 470 microfarads.

The voltage on the positive voltage bus line 22a is fed back to the pulse width modulator/power factor correction circuit 150 by means of the coupling line 162, the resistor 160 and the coupling line 164. Thus, the current limiting resistor 160 provides a feedback path for the voltage supplied to the DC voltage bus 22 to the voltage feedback input terminal $V_F$ of pulse width modulator/power factor Correction circuit 150. The pulse width modulator/power factor correcting circuit 150 controls the switching of MOSFET 148 so as to regulate the voltage generated in inductor 130, and maintain a regulated voltage of 390 volts impressed between the DC voltage bus lines 22a and 22b. The switching of MOSFET 148 is controlled so as to generate a current in inductor 130 which is reflected at the input 16 as a current whose phase is maintained in close relation to the phase of the voltage from the AC source.

In addition to regulating the voltage of bus 22, pulse width modulator/power factor correction circuit 150 controls the current supplied to the bus as well as regulating the voltage, the current feedback information being supplied by the secondary winding 136 of current monitoring transformer 132 and secondary winding 146 of current monitoring transformer 142, which are coupled in parallel relation. Secondary winding 146 provides feedback of the current flowing through the switching device 148. The two secondary windings 136 and 146 are each coupled in series with a respective diode 156 and 154, the cathode of both diodes being coupled together to the system ground 116. The opposing end of each of the windings 136 and 146 are coupled together for providing an output to the feedback current input terminal $I_F$ of the pulse width modulator circuit 150, through the coupling line 158. Resistor 141 and capacitor 143 are coupled in parallel relation between the feedback coupling line 158 and ground 116 to provide filtering thereof. The windings 136 and 146 are phased such that each provides a signal on alternate half cycles of the switching signal supplied on line 152, thereby time division multiplexing the respective current feedback signals. Thus, the pulse width modulator circuit 150 may vary the duty cycle of the control signal which drives MOSFET 148 in order to control the current which flows through the switching device as well as the current which is supplied to bus 22, and vary the duty cycle of the control signal in order to regulate the voltage induced in inductor 130.

The pulse width modulator/power factor correction circuit 150, in order to maintain an input current which is in phase with the AC input voltage, monitors the input signals supplied to the system. The input signals are represented by the rectified voltage supplied to node 125 and a current drawn therefrom. A representation of the AC voltage is supplied to the AC input voltage terminal $V_{AC}$ through a voltage divider defined by resistors 153 and 155, the center tap therebetween being coupled to the $V_{AC}$ terminal by the coupling line 157. The series combination of resistors 153 and 155 are coupled between the node 125 and the system ground 116. A representative current is supplied to the AC current input terminal $I_{AC}$ of pulse width modulator 150 from node 125 through the resistor 151 and coupling line 159. Pulse width modulator circuit 150 utilizes the wave form of the current passing through resistor 151 as a reference for generating a full wave Sinusoidal current in inductor 130 to derive substantially unity power factor at the input. The pulse width modulator/power factor correction circuit 150 is a commercially available integrated circuit device having the designation UC3854A, available from Unitrode Integrated Circuits Corp. of Merrimack, N.H.

As previously discussed, particular control signals are provided from the central control circuit 30 to the power factor correction of converter 20. Two of the signals provided are the bias supply voltage supplied to the voltage supply terminal $V_{cc}$ of pulse width modulator 150 by means of the coupling line 196. A synchronization signal is also supplied by line 198 and coupled to the SYNC input terminal of circuit 150. Pulse width modulator circuit 150 also includes an enable/inhibit input terminal INH for inhibiting the output from the drive terminal responsive to a signal supplied to the INH input. Several logic functions are coupled to the INH input terminal for inhibiting generation of the boost voltage responsive to particular predetermined conditions.

One such condition for inhibiting generation of the boost voltage is an input undervoltage condition. After the system has completed the start up cycle, if the input voltage subsequently drops below 80 volts, the boost voltage generation is shut down. If the battery backup module is not available when the input voltage drops below 80 volts, then the whole system is shut down. The positive output voltage terminal 112 of rectifier 110 is monitored to provide a representation of the input AC voltage. Thus, a current limiting resistor 184 is coupled to terminal 112 to provide the input voltage representation to the comparator 186 via the coupling line 195. Comparator 186 compares the voltage supplied on coupling line 195 with a first reference voltage $V_{REF1}$. The output of comparator 186 is coupled to an inverter 190 by the coupling line 188, the output 192 of inverter 190 is coupled to the inhibit input terminal pulse width modulator circuit 150 by coupling line 172. The output of comparator 186 is also coupled to an input of the logic circuit 180 by the coupling line 174. Logic circuit 180 provides a system shut down output on line 175 responsive to the signal on line 174 indicating that the input voltage has dropped below 80 volts and an input signal supplied on line 182 indicating that the battery backup module is either present or not. Whether the battery backup module is present is indicated by the interlock switch 183 which is part of the battery backup module 40, and may be formed by a jumper coupled between a pair of connector pins of the module.

An overvoltage shut down function is also provided for use in protecting the operation of the power supply system 10, as will be described in following paragraphs. The bus voltage supplied on line 22A, supplied through resistor 160 is also coupled to the comparator 168, by the coupling line 166. Comparator 168 compares the voltage on the bus with a second reference voltage $V_{REF2}$, supplied to the comparator 168 by the coupling line 178. The output 170 of comparator 168 is coupled to the inhibit input terminal INH by the coupling line 172. The second reference voltage $V_{REF2}$ is selected such that the boost voltage is limited to a maximum value of approximately 450 volts, which will protect the battery backup module and the output converter modules.

Figure 10:
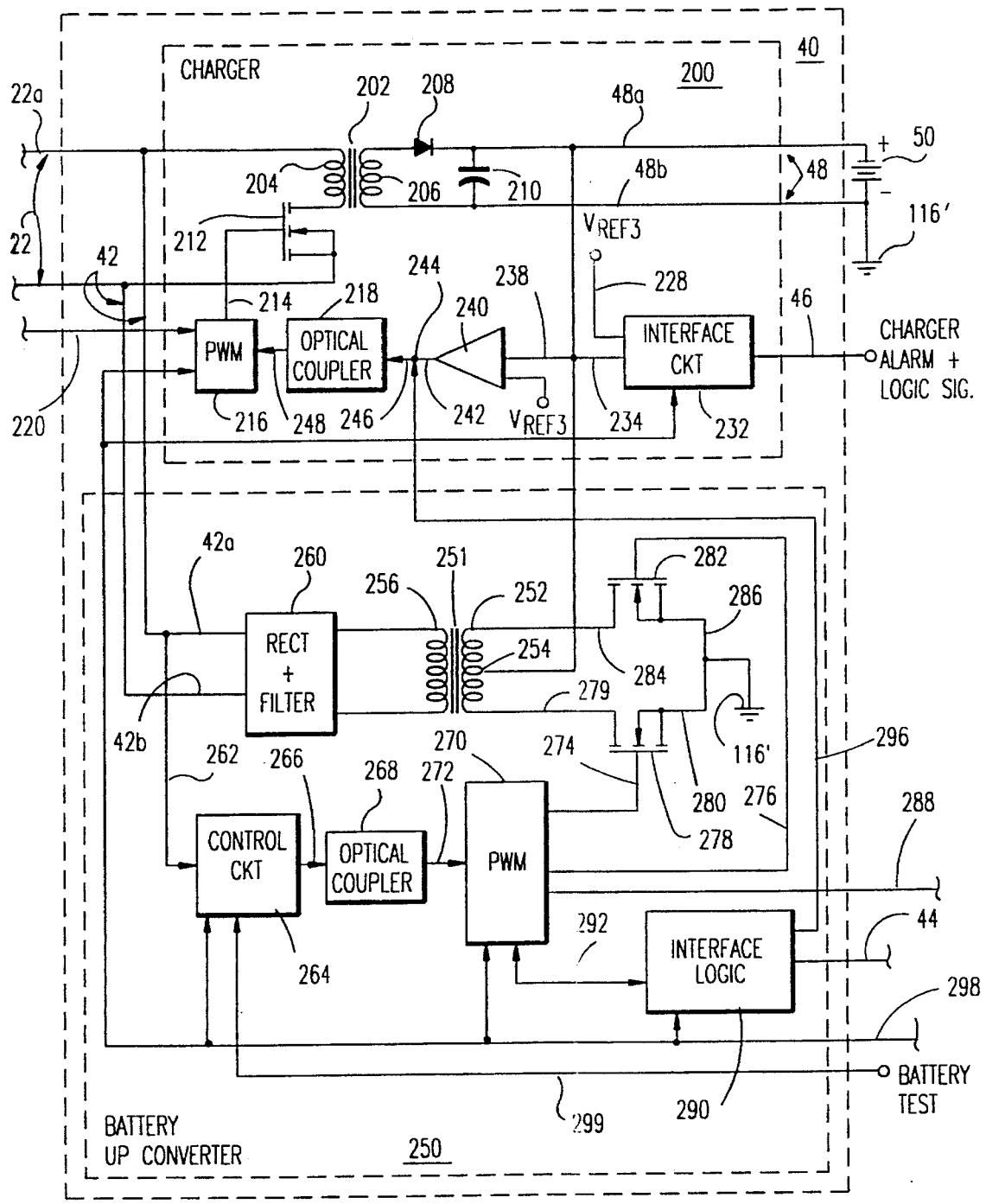
FIG. 10 is a circuit diagram of the battery backup module of the present invention.

Referring now to FIG. 10, there is shown, the battery backup module 40 which comprises two major components, a charger 200 and a battery up converter 250. The charger circuit 200 is basically a down converting inverter circuit for converting the 390 volts DC supplied on bus 22 to a 56 volt DC level for charging the backup battery 50. This inverter circuit includes a controlled leakage inductance transformer 202 having a primary winding 204 coupled in series with a switching device 212 across the voltage bus 22. Switching device 212 may be a single MOSFET device, or a parallel arrangement of such devices controlled by a pulse width modulator circuit 216. For simplification, the feedback connections to pulse width modulator 216 have not been shown, as such may be derived in a similar manner to that which has been described for the power factor correction of converter circuit 20, and such feedback connections for pulse width modulators are well known in the art. Pulse width modulator circuit 216 is a commercially available circuit having the designation UC3844 manufactured by Unitrode Integrated Circuits Corp. having an output drive signal supplied to the gate of the MOSFET switching device 212 through the coupling line 216. The high frequency switching of current through the primary winding 204 induces a voltage in the secondary winding 206 which is rectified by diode 208 and filtered by capacitor 210, to provide a voltage on the battery supply bus 48 for charging battery 50. The negative supply line 48b of bus 48 is coupled to the battery system ground 116' to provide a reference for the positive battery voltage supplied on line 48a. The battery voltage is supplied to the battery up converter 250 through the coupling line 222, which is monitored by the interface circuit 232.

The battery voltage is coupled to interface circuit 232 by the input coupling line 234, wherein the battery voltage is compared with a third reference voltage $V_{REF3}$ supplied to the circuit on line 228. The output of interface circuit 232 is supplied on coupling line 46, which provides logic level alarm signals to an external system, such as the computer or telecommunications system which is being powered by system 10. The presence of the battery is also monitored by the comparator 240, which receives the battery voltage through the input coupling line 238, providing an output on line 242 to the optical coupler 218 through the coupling line 246, responsive to the voltage on line 238 being less than the third reference voltage which is supplied to the comparator 240.

Thus, if the battery 50 is electrically removed from the battery supply bus 48, a signal supplied from optical coupler 218 on line 248 is coupled to the pulse width modulator 216 for raising its output voltage to approximately 60 volts, from the charger. Responsive to the 60 volt level, interface circuit 232 outputs an alarm signal. Other connections, not shown, to interface circuit 232 may provide such information as charging current, battery load current, a low battery voltage indication, a battery open indication and various temperature measurements. An output from the battery up converter, provided on line 296, is coupled to the node 244, disposed between the output of comparator 240 and the input of optical coupler 218, for inhibiting the operation of the charger when the up converter 250 is enabled. Thus, the pulse width modulator is inhibited responsive to a signal on line 248 from the optical coupler which in turn is generated responsive to either an output from comparator 240 indicating the battery voltage is less than the third reference voltage, or an output from the interface logic circuit 290 of the up converter 250 indicating that the voltage bus 22 is being supplied power from the up converter 250. The pulse width modulator 216 is supplied a synchronization signal on line 220, and provided with a DC operating voltage by the line 298.

The battery up converter 250 includes an up converter circuit utilizing a controlled leakage inductance transformer 251 for generating a 360 volt DC output from the 48 volt battery source. The battery voltage is supplied from the positive bus line 48a to the center tap 254 of inverter transformer primary winding 252 by the coupling line 222. Each of the opposing ends of the primary winding 252 of transformer 251 are respectively coupled to a switching device 278, 282 for alternately drawing current through a respective half of winding 252. By this arrangement, one end of winding 252 is coupled to the drain 284 of the MOSFET switching device 282, with the source 286 of device 282 being coupled to the battery system ground 116', to thereby complete a current path from the positive lead of battery 50, through the center tap of winding 252 through one half of the primary winding 252 to the battery ground reference 116'. Similarly, the opposing end of winding 252 is coupled to the drain 279 of the MOSFET switch 278, its source 280 being coupled to the battery system ground 116'.

A pulse width modulator circuit 70 provides respective drive outputs 274, 276 which are coupled to the respective gates of MOSFETs 278, 282, switching each on in alternate half cycles. Responsive to the alternating current driven through the respective portions of primary winding 252, a voltage is induced in the secondary winding 256 of controlled leakage inductance transformer 251 which is coupled to the rectifier and filter circuit 260. Rectifier and filter circuit 260 is conventional in nature, providing an output on the output DC bus line 42 to the DC voltage bus 22. Here again, the feedback signals for maintaining regulation of the induced voltage is not shown for simplicity, but such connections are well known in the art. Pulse width modulator 270 is a commercially available integrated circuit having the designation of UC3825A available from Unitrode Integrated Circuits Corp.

When the high voltage DC bus 22 is above a predetermined level, the operation of pulse width modulator 270 is inhibited, the output drive signals being inhibited while the remainder of the circuit is operational, such as the high frequency oscillator and feedback monitoring circuits, such that the drive signals can be properly supplied to the MOSFET switches when the inhibit signal is removed. The voltage on the positive bus line 22a is coupled to the up converter output line 42a and from there to the logic circuit 264 by the coupling line 262. Control circuit 264 compares the voltage on the bus line 22a with a reference voltage so as to provide an output error signal on line 266 responsive to the voltage on bus line 22a for regulating the bus at 360 volts, and thereby inhibit voltage generation when the bus voltage is greater than 360 volts.

The output from control circuit 264 on line 266 is coupled to an optical coupler circuit 268, for providing isolation. The output of optical coupler circuit 268 is supplied to the pulse width modulator 270 by coupling line 272. Thus, when the voltage is properly generated by the power factor corrected boost converter circuit 20, the voltage on bus line 22a will be approximately 390 volts, which will in turn result in an output signal from control circuit 264 which inhibits the operation of pulse width modulator 270. If however the AC voltage input to the power factor corrected up converter 20 is lost for any reason, capacitor 140, shown in FIG. 9, will begin to discharge, and as the discharge voltage drops to 360 volts, control circuit 264 will generate an error signal which will allow pulse width modulator 270 to control the MOSFET switches 278 and 282. Responsive to the operation of the MOSFET switches, the secondary winding 256 will provide an induced voltage to the rectifier filter circuit 260, for supplying the DC voltage bus 22 with a 360 volt voltage, and thereby maintain power to the various other modules 70a–70n coupled to the bus 22.

Since the voltage change on the bus 22 is not greater than approximately 7% during the transition of supplying voltage thereto from the power factor corrected up converter 20 to the battery up converter 250, there is no glitch, transient or voltage droop in the output voltage lines 72a–72n of the down converter modules 70a–70n, since this change in bus voltage is well within the regulation parameters of the output modules. Similarly, there is no interference generated when the AC power is restored, as the battery up converter 250 will cease to operate as soon as the voltage on bus 22 is raised above the 360 volt level, which will occur when the power factor corrected up converter 20 again is generating the boost voltage. Voltage droop conditions are also avoided by virtue of the low voltage shut down, incorporated into the power factor corrected boost converter 20, as has previously been described. Thus, if the input voltage decreases to a level less than 80 volts (RMS) the boost converter circuit 20 is inhibited from operating, thereby causing the voltage on the DC bus 22 to decrease, which in turn will allow the battery up converter 250 to maintain the power to the output modules.

Particular operating parameters of the battery up converter 250 are supplied to the interface logic circuit 290 by the coupling line 292 for output to external systems on the interface bus 44. Further, an output from interface circuit 290 is provided to the charger through the coupling line 296 to inhibit the charger's operation during operation of the up converter, as has previously been described. A synchronization signal from the central control circuit 30 is provided to the pulse width modulator 270 by means of the coupling line 288. Further, the DC voltage for powering the logic circuits, the bias voltage, is supplied on line 298 to the interface logic circuit 290, pulse width modulator 270 and control circuit 264 of the up converter 250, as well as to the pulse width modulator 216 and interface circuit 232 of the charger 200.

Periodically, it may be desirable to test the battery backup module 40 to insure that such is operational and performs to specification. However, where the modular power supply system 10 is coupled to a live load, one which must be maintained operational, it would be imprudent to simply remove the AC power source as the means of testing the battery backup function. It is therefore desirable to provide a means for testing the operation of the battery up converter 250 without the danger of losing the ability to maintain the voltage of bus 22. Such a battery backup test function has been incorporated into the system 10. An external signal supplied to the battery test input terminal is coupled to the control circuit 264 by the coupling line 299. This logic signal is coupled to the pulse width modulator 270 through an optical channel of the optical coupler circuit 268, such coupling being represented by the coupling line 272. The function of this signal is to shift the voltage regulating operating point of pulse width modulator 270 from 360 volts to 415 volts.

Responsive to this test signal, the pulse width modulator 270 is enabled with the bus voltage at the 390 volt level, and is raised to 415 volts by the up converter circuit 250. The internal error amplifier of the PWM 150 of the power factor correction boost converter circuit 20 senses the bus voltage is above 390 volts, and thus shuts down the output drive signal to the MOSFET 148, while maintaining its other circuit functions in an operational state. Obviously, if there is a problem in the battery backup module 40 which does not permit the generation of the DC output voltage on the output lines 42, the DC voltage bus 22 will be maintained at the 390 volt level, the load will remain undisturbed, and an alarm signal will be output from interface logic circuit 290.

If the battery backup module 40 operates properly when in the battery test mode, the voltage on the bus will be raised to the 415 volt level, the power factor correction up converter circuit 20 will be shifted to a standby mode and the regulation of the output modules 70a–70n will be unaffected by the small increase in bus voltage. Subsequent to removal of the battery test signal, the operation of pulse width modulator 270 will be inhibited, since its operating point will be returned to 360 volts and the bus voltage will be above 360 volts. The voltage on the DC voltage bus 22 will bleed off, and such will be sensed by the error amplifier of the PWM 150, which will reactivate the output drive signal of the pulse width modulator 150 once the bus drops to approximately 390 volts.

Figure 11:
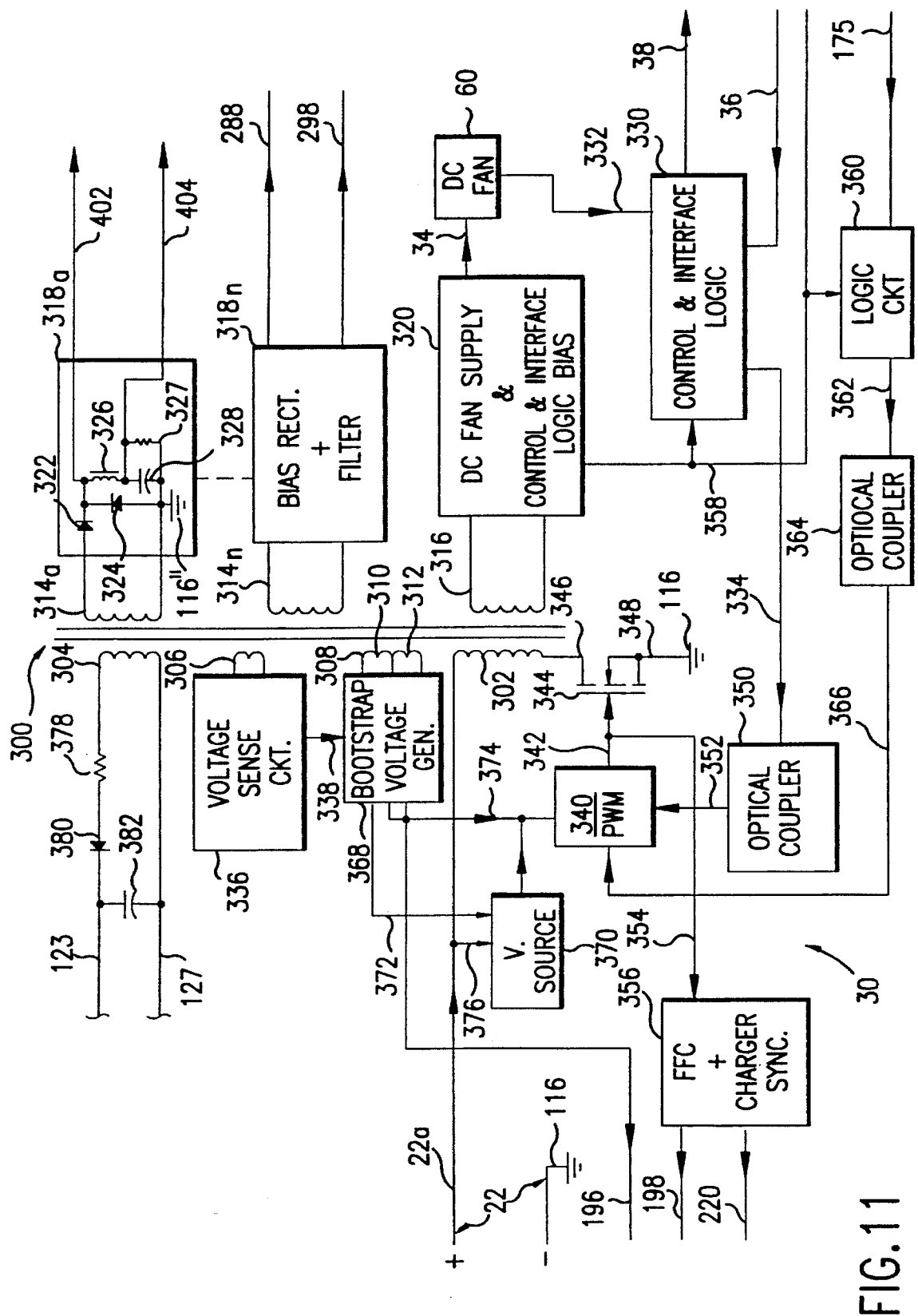
FIG. 11 is a circuit diagram of the central control circuit of the present invention; and, FIG. 12 is a circuit diagram of a down converter circuit of the present invention.

Referring now to FIG. 11, there is shown the central control circuit 30 which supplies synchronization and bias voltages to the various modules of the system 10. When system 10 is initially energized, the voltage supplied to the DC bus 22 begins to rise from a zero value, the voltage initially being supplied through the in-rush current limiting resistor 118 and bypass diode 128. During this initial time period the pulse width modulator 150 of the power factor correction boost converter circuit is not operational, as there is not yet sufficient voltage on line 196 to properly power pulse width modulator 150. The DC voltage initially supplied to the voltage bus line 22a is coupled to a voltage source 370, formed by a constant current source supplying a capacitor, through the coupling line 376 for providing an operating voltage ($V_{cc}$) to pulse width modulator 340. The voltage on bus line 22a is also supplied to one end of the primary winding 302 of the transformer 300, which may also be a controlled leakage inductance transformer. The opposing end of primary winding 302 is coupled in series relation with the switching device 344, which may be one or more MOSFET switching devices having a drain connection 346 coupled to primary winding 302 and a source connection 348 coupled to the system ground 116. Thus, as the voltage on the bus line 22a begins to rise, the pulse width modulator 340 operates to switch current through the primary winning 302. Responsive to the switching current in primary winding 302, the multiplicity of secondary windings of transformer 300 generate induced voltages therein. As the voltage increases on bus line 22a, the respective voltages generated in the secondary windings of transformer 300 also increase.

The voltage induced in secondary winding 304 is rectified by diode 380 and filtered by capacitor 382. The anode of diode 380 is coupled to one end of winding 304 through the current limiting resistor 378, the opposing end of winding 304 being coupled to the reference voltage line 127. The rectified voltage from diode 380 is coupled to, the gate drive line 123 which is in turn coupled to the gates of SCRs 122 and 124, shown in FIG. 9 and the reference line 127 is coupled to the cathodes of SCRs 122 and 124 to provide a reference for the gate voltage. Thus, when the voltage generated on line 123 is sufficient to turn on SCRs 122 and 124, the in-rush current limiting resistor 118 is thereby bypassed, as has previously been described.

The pulse width modulator circuit 150, shown in FIG. 9, receives its power from a bootstrap voltage generating circuit 368. Bootstrap voltage generating circuit 368 generates sufficient voltage for operating the pulse width modulator 150 during the initial start up phase, then subsequently provides a change in transformation ratio to prevent the supply voltage from exceeding predetermined limits. By providing such a transformation ratio change, limiting the voltage generated by the bootstrap voltage generating circuit, allows the use of Shottkey type rectifying diodes, which are more efficient. When the output of the bootstrap voltage generating circuit 368 is sufficient to power the pulse width modulators 150 and 340, an output signal supplied on line 372 shuts down the voltage source circuit 370, thereby allowing the bootstrap voltage generator circuit to supply power to the pulse width modulator 340 through the coupling line 374. The bootstrap voltage generator circuit enables the pulse width modulator circuit 150 to be brought on line sooner than if it were simply powered from a rectification circuit coupled to one of the secondary windings of transformer 300.

The output drive signal of pulse width modulator 340, supplied to the MOSFET 344 on line 342 is coupled to the power factor correction and charger sync circuit 356 through the coupling line 354. The synchronization circuit 356 utilizes the oscillation signal from the pulse width modulator to provide synchronization signals to pulse width modulator 150 through the coupling line 198 and to pulse width modulator 216 of charger circuit 200 through the coupling line 220. The secondary winding 306 is coupled to a voltage sense circuit 336, which provides an output to the bootstrap voltage generator circuit through the coupling line 338 when the induced voltage of winding 306 exceeds a predetermined value.

The signal from voltage sense circuit 336 is utilized to change the transformation ratio which provides the input thereto. The voltage generated by bootstrap voltage generator circuit 368 is derived from the output of the secondary winding 308, which is the combination of voltages induced in the tapped winding portions 310 and 312. Responsive to the signal output from voltage sense circuit 336, the winding 310 is preferably opened, thereby reducing the magnitude of the input voltage to the voltage generating circuit 368.

Transformer 300 includes a plurality of secondary windings 314a–314n for providing bias voltage to the various modules of system 10. Each of the windings 314a–314n is coupled to a respective bias rectifier and filter circuit 318a–318n for supplying bias voltage and synchronization signals to the respective modules. The bias rectification and filter circuits may include a pair of diodes 322 and 324, each having an anode thereof coupled to an opposing end of the secondary winding 314a. the cathodes of each diode are respectively coupled to the sync signal line 402 for coupling to a respective down converter module circuit 70. The common cathode connection of diodes 322 and 324 is also coupled to one end of a choke 326, the opposing end of choke 326 being coupled in series relation with the parallel RC circuit formed by capacitor 326 and resistor 327, and the DC output line 404 which supplies the power supply voltage, with respect to a module ground 116", to the logic and pulse width modulator circuits of the respective down converter module, to which it is coupled.

Such a rectification and filter circuit is provided for each of the down converter modules 70a–70n of system 10. One of the rectification and filter circuits 318n supplies synchronization signals, output on line 288, to the pulse width modulator 270 of the battery up converter 250, shown in FIG. 10. The DC voltage supplied on line 298 provides the operating voltage for the pulse width modulators and logic circuits of the battery backup module 40, as has previously been described. An additional secondary winding 316 is coupled to a logic power supply circuit 320 for powering the DC cooling fan 60 of system 10 and the logic circuits of the central control circuit 30. A DC output voltage supplied on line 34 powers the fan 60, and an output is similarly provided for powering the control and interface logic circuit 330, and the logic circuit 360 by means of the coupling line 358. Line 196, in addition to supplying PWM 150 also provides power for the comparators 168, 186 and 190 of boost converter 20, delaying their energization and that of PWM 150 relative to pulse width modulator 340, such that the low voltage inhibit function does not interfere with initial start up of system 10. The control and interface logic circuit 330 monitors the operation of the DC fan, through the fan fail monitoring line 332, receives a status from the output modules on line 36, and outputs alarm and status signals on the interface bus 38.

The generation of the bias voltages for powering the logic circuits of all of the modules in system 10 provides a unique and efficient means for providing a shut down of the entire system. When conditions indicate that the whole system should be shut down, such as when the input voltage drops below 80 volts and the battery backup module is not present, logic circuit 180, shown in FIG. 9, outputs a shut down signal on line 175. That signal is coupled to the logic circuit 360 of the central control circuit 30. Logic circuit 360 provides an output signal of appropriate polarity to the optical coupler 364 by means of the output coupling line 362. Optical coupler 364 provides an optically isolated signal output on line 366 for inhibiting the output of pulse width modulator 340. Thus, the switching device 344 is maintained in an off state to thereby cease the induction of voltage in the plurality of secondary windings of transformer 300. Hence, the DC voltages that were supplied to the logic circuits and pulse width modulators of each of the output modules, the battery backup module and the power factor corrected boost converter are substantially simultaneously cut off, quickly shutting down the entire system from a central point. As shown in the representative bias rectifier and filter circuit 318a, each of the bias supplies is provided with a bleed resistor 327, such that the bias voltage is quickly brought down when the induced voltage supplying the rectifier circuit is cut off. It should be understood that the drawing Figures have been produced in a simplified form to provide clarity of the inventive concept. Those elements for which it is deemed important that their source of power be illustrated, are shown connected to a particular source. Those elements whose source is not shown are connected to the respective bias voltage source for the particular module. Further, all elements powered from a DC source are coupled to a respective ground as a reference for their particular $V_{CC}$ input.

Figure 12:
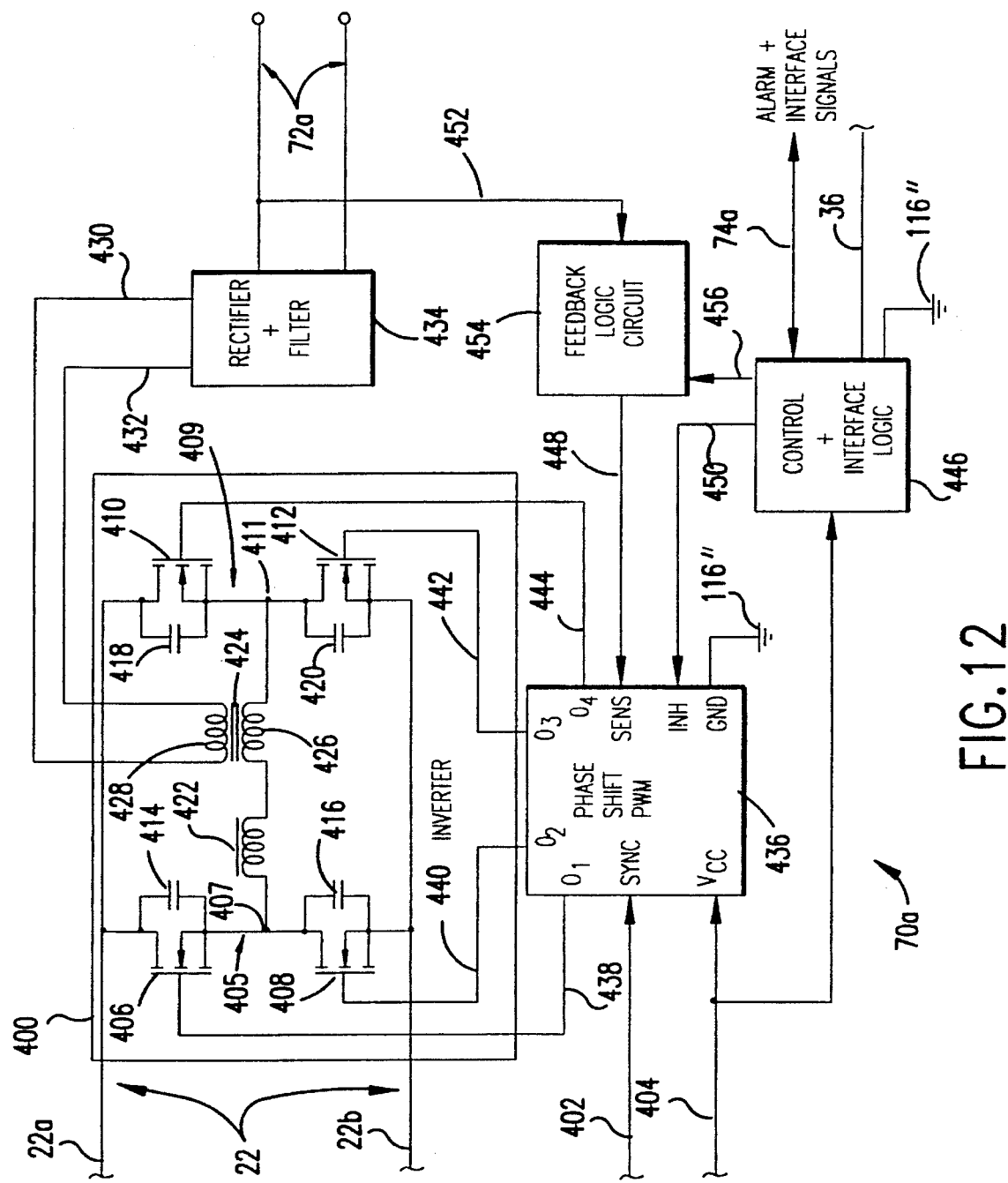

Referring now to FIG. 12, there is shown a typical output module 70a for converting the high voltage supplied on the DC bus 22 to a predetermined output voltage on the output lines 72a for use by a predetermined load. The DC voltage bus 22 is coupled to a high frequency inverter 400 whose output is coupled to a rectifier and filter circuit 434 to supply the required DC voltage on the output lines 72a. Inverter 400 is a bridge type switching circuit, sometimes referred to as an H-switch circuit, wherein the output is taken from the coupling between the central portion of each leg thereof. Each leg comprises a pair of switching devices coupled in series relation which are operated alternately. Thus in the leg 405, there is provided a MOSFET switching device 406 coupled between the positive line 22a of the DC voltage bus and the output node 407. A second switching MOSFET 408 is coupled between the node 407 and the DC voltage bus return line 22b. Similarly, the leg 409 comprises a MOSFET switching device 410 coupled between the positive line 22a of voltage bus 22 and the output node 411. A MOSFET 412 is coupled between the output node 411 and the DC voltage bus return line 22b. Each of the respective four MOSFETs 406, 408, 410 and 412 have their respective gates coupled to the output drive terminals $O_1$, $O_2$, $O_3$ and $O_4$ of the phase shift pulse width modulator 436 by the respective coupling lines 438, 440, 444 and 442.

Phase shift pulse width modulator 436 controls the operation of each of the four MOSFET switching devices such that the MOSFETs 406 and 412 are turned on during one portion of an AC cycle and MOSFETs 408 and 410 are operated during an alternate half cycle, to provide bi-directional current flow through the primary winding 426 of the controlled leakage inductance transformer 424. In order to provide the minimum stress on the circuit components and minimize the generation of harmonic signals, the switching of current through primary winding 426 is best accomplished when the voltage across each MOSFET is 0 volts. To accomplish this 0 voltage switching, the energy which is stored in primary winding 426 and the leakage inductance 422 of transformer 424 must induce a voltage equal the bus voltage. It is for this reason that it is important that the leakage inductance of transformer 424 be predictable and consistent from one transformer 424 to another, and since the leakage inductance is additive, it is equally important that its value be similarly known and controlled.

Each of the MOSFET switching devices has an intrinsic capacitance 414, 416, 418 and 420 between the respective source and drain terminals thereof. This intrinsic capacitance is a known value which is very consistent from one device to another, as such is a function of the device topology which is substantially invariant from one device to another. The capacitance value for each of the devices 406, 408, 410 and 412 is a relatively low value, in the picofarad range. Therefore, it is desirable to have a suitable inductance coupled therewith to form a resonant circuit, such that the stored energy can be efficiently transferred. Since the leakage inductance 422 effectively appears as an inductance value which is in series with the mutual inductance reflected in the primary winding 426, such is shown as a separate element coupled in series with the primary winding 426 between the output nodes 407 and 411.

The alternation of current through primary winding 426 induces a voltage in secondary winding 428, the opposing ends of which are coupled to the rectifier and filter circuit 434 through the coupling lines 432 and 430. Rectifier and filter circuit 434 is conventional in nature, and thus not described in any detail. Obviously, if an AC voltage is desired for supply to a particular load, the rectifier filter circuit 434 may be eliminated and the output from the secondary winding 428 provided thereto. Feedback from the output voltage line 72a is supplied to the "Sens" input of pulse width modulator 436 by the coupling line 452, feedback logic circuit 454, and coupling line 448, allowing the phase shift pulse width modulator 436 to control the switching of the respective MOSFETs 406, 408, 410 and 412 to maintain the output voltage or current at a predetermined level. Here again, connections for feedforward, and current feedback have not been shown for purposes of clarity, since such connections to pulse width modulators are well known in the art and not required for an understanding of the inventive concept.

Thus, the feedback line 452 may represent voltage or current feedback, for discussion purposes. The feedback signal from line 452 is applied to the output line 448 of feedback logic circuit 454, unmodified, if no control signal is input on line 456 from control and interface logic circuit 446. The function of that control signal applied through line 456 will be described in following paragraphs. The output module 70a further includes a control and interface logic circuit 446, for providing the inhibit signal to the phase shift pulse width modulator 436, by means of coupling line 450, as well as providing an interface for alarm and other signals which are exchanged between the module 70a and the particular load to which it supplies power. Control and interface logic 446 also provides a status output on line 36 to the control and interface logic circuit 330 (FIG. 11), indicating whether the output module is operating properly or not. As previously described, a synchronization signal is supplied on line 402 to the SYNC input of pulse width modulator 436 and the bias supply voltage form the circuit 318a is supplied on line 404 to the $V_{CC}$ input of pulse width modulator 436 and the voltage supply input of the control and interface logic 446, which permits the system to be shut down, as was previously described.

Multiple output converter modules 70 may be coupled in parallel to a load with the load current being equally divided among the paralleled modules. When this option is utilized, a control signal is input on the respective interface bus 74. Thus, if module 70a is being paralleled with module 70b, or a module 70a of another power supply system, then the power sharing control signals will be respectively on the buses 74a and 74b. This control signal, as shown in FIG. 12, is input to the control and interface logic circuit 446 of each module. The control and interface logic circuit 446 outputs a control signal to the feedback logic circuit 454. In response to the input from signal line 456, feedback logic circuit 454 modifies the feedback signal provided from feedback line 452 to generate a signal on line 448 which maintains a load current value substantially equal to that of the other paralleled module 70b.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is being claimed is:

1. A power supply, comprising:
   a. switching means for generating an oscillation signal responsive to a switching control signal;
   b. inverter means coupled to said switching means for converting a direct current voltage of a first magnitude to an output voltage of a second magnitude responsive to said oscillation signal, said inverter means including an inverter transformer having a winding structure adapted to provide a controlled leakage reactance for maintaining stable circuit conditions, said inverter transformer having a primary winding coupled to said switching means for coupling said oscillation signal thereto;
   c. pulse width modulator means coupled to said switching means for generating said switching control signal responsive to at least one feedback signal and an absence of an inhibit signal; and, d. control means coupled to said pulse width modulator means for generating an inhibit signal for terminating said switching control signal responsive to said direct current voltage first magnitude being less than a predetermined value, said predetermined value being greater than zero.

2. The power supply as recited in claim 1 where said switching means includes a resonate switching circuit coupled to said primary winding of said inverter transformer, said resonate switching circuit including at least a pair of transistors, each of said pair of transistors being coupled to opposing ends of said primary winding of said inverter transformer and having a capacitance in parallel relation therewith.

3. The power supply as recited in claim 1 where said switching means includes (1) at least one switching element having an interruptable conduction path therethrough, one end of said interruptable conduction path being coupled to one end of said primary winding of said inverter transformer, and (2) capacitance means coupled in parallel relation with said interruptable conduction path of said switching element for forming a resonant circuit with said primary winding of said inverter transformer.

4. The power supply as recited in claim 1 where said inverter transformer winding structure includes a core, said primary winding being formed by a longitudinally extended insulating substrate wound on said core with a first conductive member having a rectangular cross-sectional contour deposited longitudinally on said insulating substrate, whereby a dimension between consecutive turns of said primary winding is defined by a thickness dimension of at least a portion said insulating substrate.

5. The power supply as recited in claim 4 where said insulating substrate is formed by a plastic material composition.

6. The power supply as recited in claim 4 where said inverter transformer winding structure includes a secondary winding coupled to said pulse width modulator means to provide said feedback signal thereto.

7. The power supply as recited in claim 6 where said secondary winding is formed by a second conductive member having a rectangular cross-sectional contour deposited longitudinally on said insulating substrate, said second conductive member being deposited in spaced parallel relation with respect to said first conductive member.

8. The power supply as recited in claim 7 where said inverter transformer winding structure further includes a plurality of blocking members disposed on opposing sides of each of said first and second conductive members.

9. The power supply as recited in claim 7 where said first and second conductive members are deposited within respective longitudinally extended spaced parallel recesses disposed on a surface of said insulating substrate.

10. The power supply as recited in claim 1 further comprising rectifier means for generating said first direct current voltage, said rectifier means having an input coupled to an AC voltage source.

11. A power supply, comprising:
 a. rectification means having an input coupled to an alternating current voltage source for deriving a first direct current voltage therefrom;
 b. voltage boost means having an input coupled to said rectification means for increasing a magnitude value of said first direct current voltage to a second direct current voltage responsive to an oscillation signal applied to a control input terminal of said boost voltage means, said second direct current voltage having a greater magnitude than said magnitude value of said first direct current voltage, said voltage boost means including an inductor having a predetermined inductive reactance, said inductor having one end thereof coupled to said control input terminal;
 c. pulse width modulator means for generating said oscillation signal responsive to a plurality of control parameter signals, said pulse width modulator means having an output coupled to said control input terminal of said voltage boost means;
 d. control means having an output coupled to an input of said pulse width modulator means for varying a duty cycle of said oscillation signal responsive to a control parameter signal, said control means including inhibit signal generation means having a first input coupled to said rectification means, and an output coupled to said pulse width modulator means for inhibiting generation of said oscillation signal responsive to a magnitude of said alternating current voltage being less than a predetermined value, said predetermined value being greater than zero.

12. The power supply as recited in claim 11 where said control means includes inhibit signal generation means having a first input coupled to said rectification means, and an output coupled to said pulse width modulator means for inhibiting generation of said oscillation signal responsive to a magnitude of said alternating current voltage being less than a predetermined value 13. The power supply as recited in claim 11 where inhibit signal generation means includes a second input coupled to said voltage boost means for inhibiting generation of said oscillation signal responsive to said magnitude of said second direct current voltage being greater than a predetermined value.

14. A modular power supply system, comprising:
 a. a DC voltage bus;
 b. boost converter means having a first input coupled to a power source for generating a first DC voltage signal from an input line voltage supplied by said power source, said boost converter means having an output connected to said DC voltage bus for coupling said first DC voltage signal to said DC voltage bus, said boost converter being operable responsive to a first control voltage signal coupled to a second input thereof;
 c. at least one converter module having a first input coupled to said DC voltage bus for converting said first DC voltage signal to a second DC voltage signal, said second DC voltage signal being of a different magnitude than a magnitude of said first DC voltage signal, said at least one converter module being operable responsive to a second control voltage signal coupled to a second input thereof;
 d. a battery backup module having a first input and an output coupled to said DC voltage bus for generating a third DC voltage signal responsive to said magnitude of said first DC voltage signal decreasing in value below a predetermined first reference value, said at least one converter module being operable responsive to said second control voltage signal coupled to a second input thereof; and,
 e. first control means for generating said first and second control voltage signals and having (1) a first input coupled to said input of said boost converter means for monitoring said input line voltage, (2) a second input coupled to said DC voltage bus for monitoring said first DC voltage signal, (3) a first output coupled to said boost voltage converter means for supplying said first control voltage signal thereto, and (4) second and third outputs respectively coupled to said at least one converter module and to said battery backup module for supplying said second control voltage signal respectively thereto, said first control means including a transformer having a primary winding coupled to said DC voltage bus and a switching circuit coupled to said primary winding for generating an intermittent current therethrough, said transformer having a plurality of secondary windings for generating said first and second control voltage signals, said first control means including bootstrap power supply means having an input coupled to one of said plurality of secondary windings and an output coupled to said first output of said first control means for generating said first control voltage signal, said bootstrap power supply means including means for changing a transformation ratio of said one of said plurality of secondary windings subsequent to an initial starting time period.

15. The modular power supply system as recited in claim 14 where said battery backup module includes:

a. high frequency inverter means having an input coupled to a battery power source for generating said third DC voltage signal responsive to a variable duty cycle oscillation signal;

b. pulse width modulator means powered by said second control voltage signal and having an output coupled to said high frequency inverter for generating said variable duty cycle oscillation signal responsive to a non-inhibit control signal; and, c. second control means powered by said second control voltage signal and having an input coupled to said DC voltage bus for generating said non-inhibit control signal responsive to said magnitude of said first DC voltage signal being less than said predetermined first reference value.

16. The modular power supply system as recited in claim 15 where said pulse width modulator means includes (1) means for generating an oscillatory signal, (2) means for varying a duty cycle of said oscillatory signal for generating said variable duty cycle oscillation signal, said duty cycle varying means having an input coupled to said oscillatory signal generating means, and (3) voltage regulation means having an input coupled to said DC voltage bus and an output coupled to said duty cycle varying means for varying said duty cycle responsive to a difference between a magnitude of said third DC voltage and a predetermined second reference value.

17. The modular power supply system as recited in claim 14 where said first control means includes means for disabling said boost converter means responsive to a magnitude of said input line voltage being less than a predetermined third reference value.

18. The modular power supply system as recited in claim 14 where said boost converter generates said first DC voltage at a substantially constant magnitude for input line voltages having an approximating range of 90 to 270 volts.

19. The modular power supply system as recited in claim 18 where said first DC voltage is approximately 390 volts.

20. The modular power supply system as recited in claim 19 where said third DC voltage is approximately 360 volts.

21. The modular power supply system as recited in claim 14 where said boost converter means includes:

a. rectifier means having an input coupled to said power source for converting said line input voltage to an input DC voltage;

b. voltage boost means having an input coupled to an output of said rectifier means for increasing a magnitude value of said input DC voltage to generate said first DC voltage signal responsive to an oscillation signal, said first DC voltage signal having a substantially constant magnitude value;

c. pulse width modulator means having an output coupled to said voltage boost means for generating said oscillation signal responsive to drive signal; and, d. power factor correction means having an input coupled to said input of said rectification means and an output coupled to said pulse width modulator means for generating said drive signal in timed relationship with respect to said input line voltage to minimize a phase difference between said input line voltage and an input line current.

22. The modular power supply system as recited in claim 21 where said voltage boost means includes:

a. at least one diode having a cathode coupled to said DC voltage bus;

b. an inductor having a predetermined inductive reactance, said inductor having a first end coupled to said output of said rectifier means and a second end coupled an anode of said diode for generating a boost voltage responsive to a switching current signal; and, c. switching means coupled to said second end of said inductor for generating said switching current signal responsive to said oscillation signal.

23. The modular power supply system as recited in claim 14 further comprising a plurality of converter modules, each of said plurality of converter modules having an input coupled to said DC voltage bus.

24. A modular power supply system, comprising:

a. a DC voltage bus;

b. control means having an input coupled to said DC voltage bus for generating a low voltage bias signal responsive to an absence of a first logic signal, said control means including voltage generating means coupled to said DC voltage bus for generating said low voltage bias signal at an output thereof responsive to said absence of said first logic signal, and first logic means having an output coupled to said voltage generating means and a pair of input terminals for generating said first logic signal responsive to concurrent receipt of a second logic signal and a third logic signal respectively at said pair of input terminals;

c. boost converter means having an input coupled to a power source for generating a first DC voltage signal from an input line voltage supplied by said power source, said boost converter means having an output connected to said DC voltage bus for coupling said first DC voltage signal to said DC voltage bus, said boost converter means including (1) a first pulse width modulator having a power input coupled to said output of said voltage generating means for generating a first drive signal on an output thereof responsive to said voltage bias signal, (2) voltage boost means having a first input coupled to said power source and a second input coupled to said output of said first pulse width modulator for generating said first DC voltage signal responsive to said first drive signal, and (3) second logic means having an input coupled to said power source and an output coupled to a respective one of said pair of input terminals of said first logic means for generating said second logic signal responsive to a magnitude of said input line voltage being less than a first predetermined value;

d. at least one converter module having an input coupled to said DC voltage bus for converting said first DC voltage signal to a second DC voltage signal, said second DC voltage signal being of a magnitude different than a magnitude of said first DC voltage signal, said converter module including a second pulse width modulator having a power input coupled to said output of said voltage generating means for generating a second drive signal on an output thereof responsive to said voltage bias signal, and first inverter means having a first input coupled to said DC voltage bus and a second input coupled to said output of said second pulse width modulator for generating said second DC voltage signal responsive to said second drive signal; and, e. a battery backup module having an input and an output coupled to said DC voltage bus for generating a third DC voltage signal responsive to said magnitude of said first DC voltage signal decreasing in value below a predetermined first reference value, said battery backup module including (1) a third pulse width modulator having a power input coupled to said output of said voltage generating means for generating a third drive signal on an output thereof responsive to said voltage bias signal, (2) second inverter means having an output coupled to said DC voltage bus, a first input coupled to an external battery voltage source and a second input coupled to said output of said third pulse width modulator for generating said third DC voltage signal responsive to said third drive signal, and (3) means for generating an interlock signal responsive to said battery backup module being installed in said modular power supply system, said interlock signal being coupled to a respective one of said pair of input terminals of said first logic means for generating said third logic signal responsive to said interlock signal indicating an absence of said battery backup module, whereby generation of each of said first, second and third DC voltages are simultaneously inhibited responsive to said generation of said first logic signal.

25. The modular power supply system as recited in claim 24, where said converter module includes means for sharing load current between a plurality of such converter modules.

* * * * *